United States Patent [19]
Wallin

[11] Patent Number: 5,273,413
[45] Date of Patent: Dec. 28, 1993

[54] THRUST BEARING FOR HIGH SPEED SCREW COMPRESSORS

[75] Inventor: Hans Wallin, West Chester, Pa.

[73] Assignee: SKF USA Inc., King of Prussia, Pa.

[21] Appl. No.: 22,543

[22] Filed: Feb. 25, 1993

Related U.S. Application Data

[63] Continuation-in-part of Ser. No. 842,894, Feb. 27, 1992, abandoned.

[51] Int. Cl.$^5$ .................. F04C 18/16; F04C 29/00; F16C 19/18
[52] U.S. Cl. .................. 418/201.1; 384/516; 384/615
[58] Field of Search .......... 418/201.1, 201.2; 384/513, 516, 615

[56] References Cited

U.S. PATENT DOCUMENTS

| | | | |
|---|---|---|---|
| 2,733,967 | 2/1956 | Jones, Jr. ............. | 384/615 |
| 4,227,755 | 10/1980 | Lundberg ............. | 384/518 |
| 4,730,995 | 3/1988 | Dewhirst ............. | 418/203 |
| 5,009,583 | 4/1991 | Carlsson et al. ........ | 418/201.1 |

FOREIGN PATENT DOCUMENTS

| | | | |
|---|---|---|---|
| 2746151 | 4/1979 | Fed. Rep. of Germany ...... | 384/615 |
| 720327 | 12/1954 | United Kingdom ............. | 384/615 |

OTHER PUBLICATIONS

SKF USA Inc., Pumpac The MRC Bearing System M213-720, Oct. 1989.
MRC Bearing Services a division of SKF USA Inc., PumpaProgram, M200-100, Oct. 1989.

*Primary Examiner*—John J. Vrablik
*Attorney, Agent, or Firm*—Eugene E. Renz, Jr.

[57] ABSTRACT

A screw compressor assembly, comprising a housing, a pair of rotors rotatably journaled in said housing, a bearing system supporting the rotors including a radial cylindrical roller bearing and thrust bearing means rotatably supporting the journals in the housing including a first angular contact thrust ball bearing having a predetermined contact angle in the range of between about 30° and 35°, and a second back-up angular contact bearing having a contact angle less than said contact angle of said first thrust bearing and in the range of between about 15° and 20°, the difference between the contact angles of the thrust bearing and backup bearing being at least between about 10° and 20° whereby the internal force due to centrifugal force is small and therefore the induced axial force in the bearing system is minimized.

5 Claims, 8 Drawing Sheets

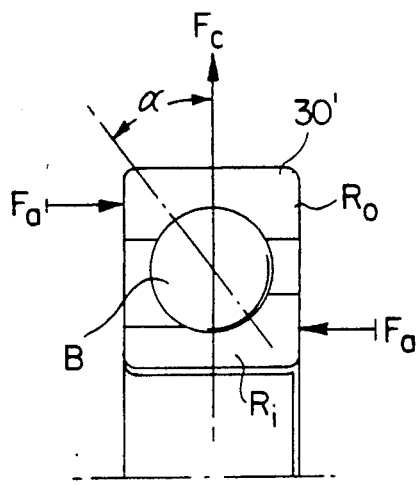
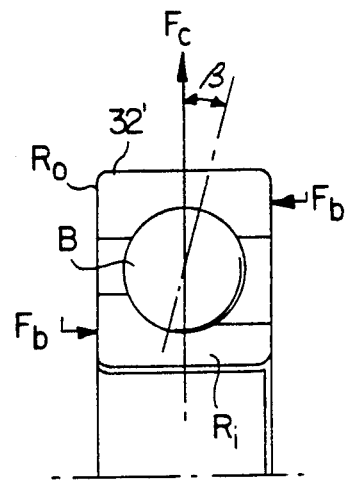
FIG. 6  FIG. 7
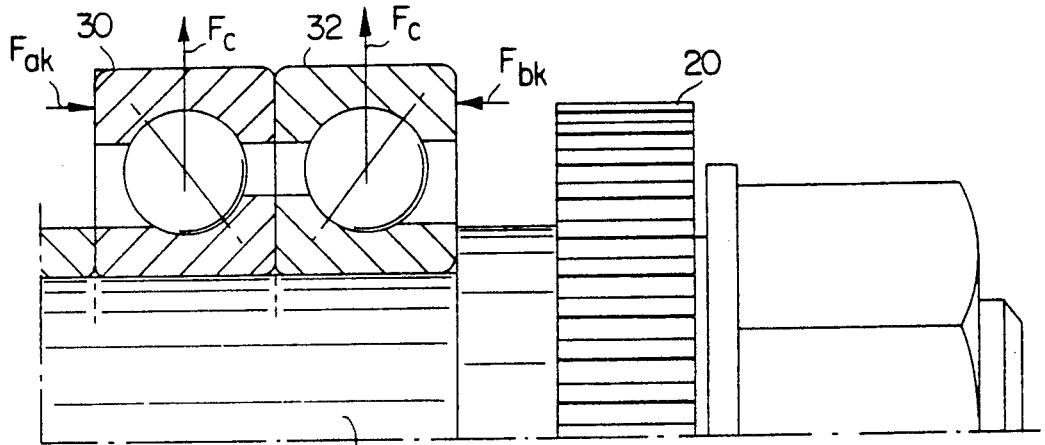
FIG. 8
(PRIOR ART)
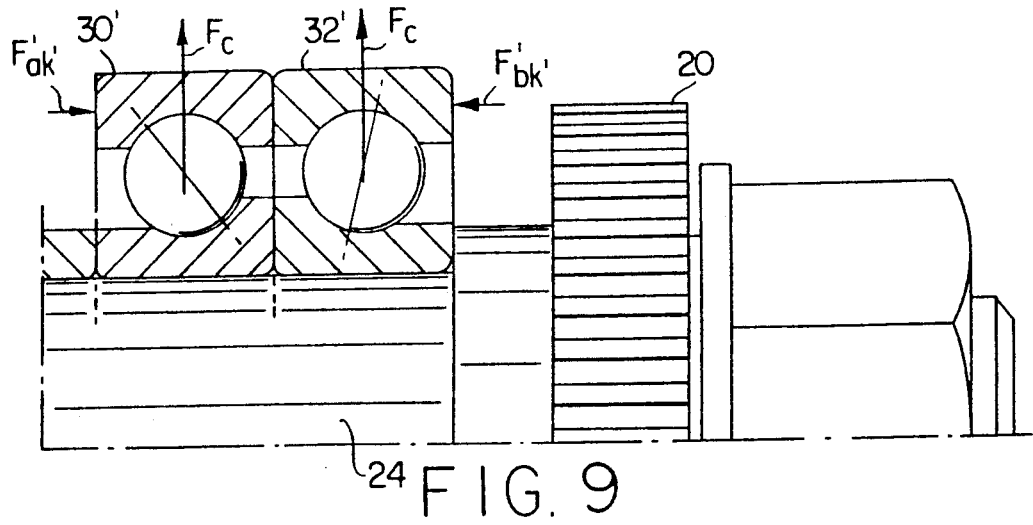
FIG. 9

$(K+F_{bk}) > (K+F'_{bk})$

THRUST BEARING FOR HIGH SPEED SCREW COMPRESSORS

This is a continuation-in-part of my prior patent application, Ser. No. 07/842,894, filed on Feb. 27, 1992 and entitled THRUST BEARING FOR HIGH SPEED COMPRESSORS, abandoned.

FIELD OF THE INVENTION

The present invention relates to improvements in thrust bearing systems and specifically for applications in high speed screw compressors producing a longer bearing life as compared with present bearing systems used in these applications.

BACKGROUND OF THE INVENTION

The present invention has a useful application in screw compressors for supporting the rotors and is particularly advantageous and useful in so called "Dry Air Screw Compressors". In Dry Air Screw Compressors, rotation of the main rotor is transmitted to an auxiliary rotor via synchronizing gears. In these assemblies, the torsional flank clearance of the gear wheels is smaller than that of a screw rotor. These compressors, which operate at high speeds and supply completely oil free compressed air, are typically used in chemical and food processing industries. There is also an increasing demand for oil free air for environmental reasons. Typical bearing mounting arrangements for the rotors of these screw compressors include a thrust bearing arrangement consisting of two single row angular contact ball bearings arranged face to face or back to back, each having the same contact angle. This type of thrust bearing mounting is not new per se and is shown in the prior art patents listed below:

| | |
|---|---|
| U.S. Pat. No. 4,227,755 | Anders Lundberg |
| BEARING ARRANGEMENT FOR SHAFT OF ROTARY COMPRESSOR | |
| U.S. Pat. No. 4,730,995 | Randy E. Dewhirst |
| SCREW COMPRESSOR BEARING ARRANGEMENT WITH POSITIVE STOP TO ACCOMMODATE THRUST REVERSAL | |

In these prior assemblies, the contact angle for the duplex set of angular contact ball bearings is in the range of 30° to 40°. One bearing functions to take up axial load which acts in one direction only at steady state operation of the compressor, and the complementary bearing, or back-up bearing, is used to control play in the rotor.

Prior to the present invention, both bearings were designed with the same high contact angle to support the thrust load of the rotors during operation of the compressor.

Prior to the present invention it was believed that providing the thrust bearing and back-up bearing with the same large contact angle would not affect the thrust capability of the bearing system. However, the prior art systems exhibited rather poor life statistics since at high speeds there is an increased internal axial force resulting from centrifugal forces acting on the balls. This means that in these prior art bearing systems the load carrying bearing has to support an axial force greater than the gas force produced by the rotors.

It has been observed that the life of bearings, particularly in demanding applications such as Dry Air Screw Compressors is limited due to the high load and high speed occurring in the system during typical operational. Various attempts have been made to increase life of the bearings in these applications including providing relatively large axial clearances in the bearings as illustrated in FIG. 4. It is noted however, that this solution is not entirely satisfactory since large axial clearances have a negative effect on compressor efficiency. Stated another way, building axial clearance into the bearings impacts on precise axial positioning of the rotors relative to one another and in the compressor housing, and this in turn impacts compressor performance adversely. The larger axial clearances in the bearing (see FIG. 4) necessitates larger clearances between the rotors and housing to avoid so called "rotor rub" and these larger clearances cause leakage of gas from the high pressure chamber or cavity of the compressor to the low pressure cavity. Thus the compressor is less efficient. Furthermore, large axial clearances produce sliding between the balls and the raceways and thus limits bearing life.

There is also disclosed in an MRC publication entitled, "PUMPAC PROGRAM" a bearing arrangement consisting pairs of angular contact ball bearings for various applications. The use of a matched set of bearings wherein one of the bearings has a contact angle of 40° and the other has a contact angle of 15° is disclosed. The PUMPAC design is identified as being for lower speeds wherein the limiting ndm is 550,000. The stated purpose of the matched set configuration in PUMPAC is to eliminate ball sliding and shuttling to produce lower operating temperatures, stable oil viscosity, consistent film thickness and longer service life. It is noted, that PUMPAC is not concerned with reducing internal forces or does not discuss or recognize the effect of centrifugal forces in a bearing system. The benefits of reduced internal loading are not significant in the low speed ranges disclosed in the MRC publication.

SUMMARY OF THE INVENTION

It has been found that at high speed operation of a screw compressor, the centrifugal forces acting on the balls produce an internal axial force build-up in the bearing with the consequence that the thrust bearing has to counteract both the gas force produced by the rotors and the induced axial force produced by the backup bearing. Further, it has been found that the induced axial force can be minimized by utilizing a small contact angle in the back-up bearing. The effect of centrifugal forces on the balls was not thought to have a significant effect on bearing system life. In accordance with the present invention, it has been found that in a bearing arrangement consisting of a thrust bearing having a contact angle in the range of between 30° to 35° and an opposed back-up bearing having a small contact angle in the range of between 15° to 20°, the life of the bearing system is extended considerably in applications such as Dry Air Screw Compressors which are subjected high load and high speed during operation. As explained in more detail hereafter, the effect of the combination is to minimize the induced axial force resulting from the centrifugal forces acting on the balls. This arrangement produces longer bearing life. Further, compressor bearing systems can be designed utilizing angular contact ball bearings with reduced clearance or preload, which is desirable in compressor applications for accurate positioning of the rotors thereby maximizing compressor performance.

Comparison studies were conducted which compared a duplex bearing support for rotors of screw compressors in accordance with the present invention, with a duplex bearing design where both the thrust bearing and back-up bearing have the same contact angle. The results show a considerable increase in bearing life over the typical speed and load range to which the bearings are subjected during operation of a high speed screw compressor. This demonstrates that the induced axial force resulting from the centrifugal force effect is minimized as graphically shown in FIGS. 10A and 10B.

With the foregoing in mind, it is an object of the present invention to provide an improved thrust bearing particularly adapted for Dry Air Screw Compressors characterized by novel features of construction and arrangement producing longer bearing life and high compressor performance.

Another object of the present invention is to provide a thrust bearing system comprised of duplex mounted angular contact bearings having different contact angles, one having a high contact angle for supporting external loads and the other having a relatively small contact angle whereby the combination reduces the internal forces resulting from the centrifugal force effect and thereby reducing the induced axial forces in the system considerably.

The present invention provides improvements over the prior art, particularly, in the bearing systems disclosed in the MRC Publications. For example, The MRC PUMPAC Bearing Systems are designed for centrifugal pumps wherein the maximum speed is up to an ndm value of 550,000. Compressor assemblies of the present are designed for operation at 750,000 to 1,100,000 ndm. The effects of centrifugal forces are pronounced in the speeds anticipated by the present invention, whereas in the PUMPAC applications, the effect of centrifugal forces is considerably smaller and thus was never a design consideration. The preferred combination in accordance with the present invention is a combination wherein the thrust bearing has a contact angle of about 30° and the back-up bearing has a contact angle of about 15°. It has been found that at speeds over ndm 750,000, the reliability of a 40° contact angle is inferior to a 30° contact angle due to excessive internal sliding and heat generation. Further, it has been observed that at speeds over ndm 750,000 the combination of a 15° back-up bearing and a 40° thrust is unsuitable for light external load since the induced axial load from the 40° bearing overloads the 15° bearing. The preferred bearing configuration of the present invention is superior under all load conditions.

BRIEF DESCRIPTION OF THE DRAWINGS

These and other objects of the present invention and the various features and details of the operation and construction thereof are hereinafter more fully set forth with reference to the accompanying drawings, where:

FIG. 6 is a schematic view showing the axial components $F_{ac}$ of the induced centrifugal force $F_c$ on the balls of a large contact angle in the range of 40°;

FIG. 7 is a similar view showing the axial force components $F_{bc}$ of the centrifugal force $F_c$ for an angular contact ball bearing having a small contact angle, for example 15° to 25°;

FIG. 8 shows the reaction forces on a duplex bearing mount for a compressor rotor in a typical prior art mounting where both bearings have the same contact angle;

FIG. 9 is a schematic view showing a bearing arrangement in accordance with the present invention;

DETAILED DESCRIPTION OF THE PREFERRED EMBODIMENT

Figure 1:
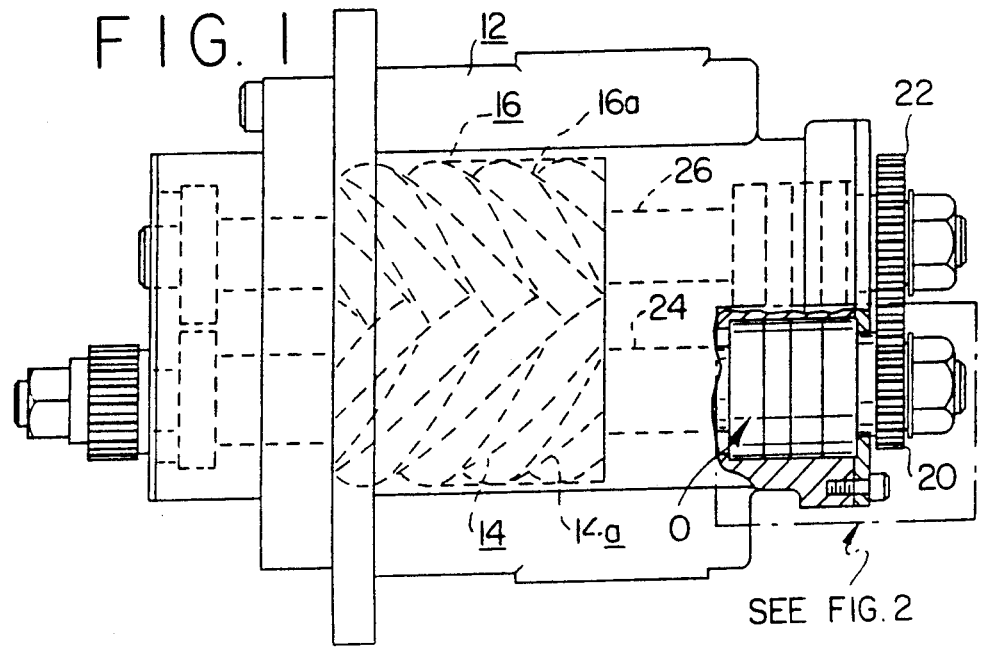
FIG. 1 is a side plan view partly in section of a dry air screw compressor incorporating a bearing mounting arrangement for the rotors constructed in accordance with the present invention.

As pointed out above, certain compressors, for example those of the dry air twin screw type operate at high speeds to maximize compressor efficiency. The commonly used thrust bearings used in these applications, consisted of two single row angular contact bearings, each having the same relatively large contact angle in the range of 30° to 40°. The reason for using large contact angles in these bearings was to maximize the capacity to carry the axial gas force produced by the rotors.

Prior to the present invention, it was believed that the internal axial forces resulting from centrifugal forces were minimal in these systems. However, the present inventor found that the reason for the relatively short life of the typical prior art large contact bearing systems was attributable to the centrifugal force effect. The induced axial force effect of the centrifugal forces can be minimized by utilizing angular contact bearings having a smaller contact angle. However, the smaller the contact angle, the lower the capacity to carry axial forces of the compressor.

As noted above, the present invention produces a bearing arrangement which minimizes the induced axial force effect of the centrifugal forces in the combined bearing system, and yet is operative to counteract and support the same or greater compressor gas loads as the combined bearing systems of the prior art. The reduction in forces in the bearing system of the present invention and the extended life of the combined bearing is best illustrated in the empirical test comparisons shown in the drawings, and the force analyses presented which are discussed in more detail hereafter.

Figure 2:
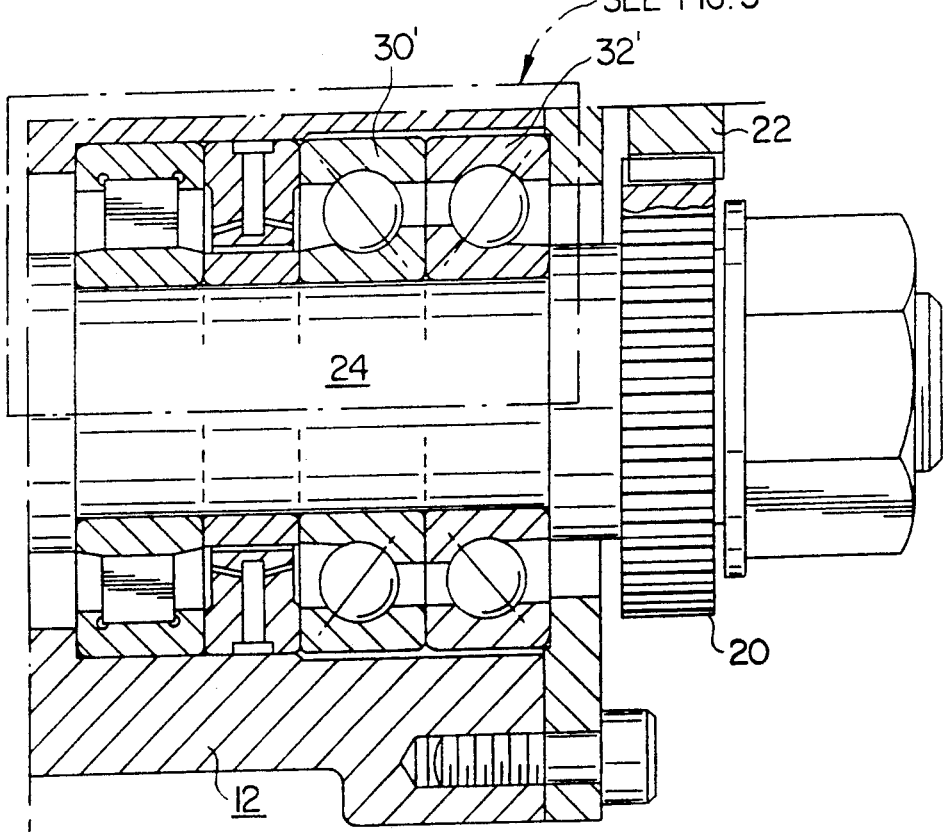
FIG. 2 is an enlarged fragmentary sectional plan view of the detail within the dot and dash lines of FIG. 1 showing a thrust bearing mounting arrangement in accordance with the present invention.

Referring now to the drawings and particularly to FIGS. 1 and 2 thereof, there is illustrated a so called Dry Air Screw Compressor incorporating a bearing mounting arrangement in accordance with the present invention generally designated by the numeral 10. The overall configuration and basic elements of the compressor are not new per se and include a housing 12, a main drive rotor 14 and a complementary, auxiliary rotor 16. Main drive rotor 14 is gear driven from a suitable drive means such as a motor and transmits rotary motion to the auxiliary rotor 16. As is typical, the rotors have complementary intermeshing helical screws 14a and 16a. Timing gears 20 and 22 connect the rotors. The main rotor and the auxiliary rotor have stub shafts 24 and 26, respectively, for mounting bearings for rotatably supporting the rotors in the housing.

Figure 3:
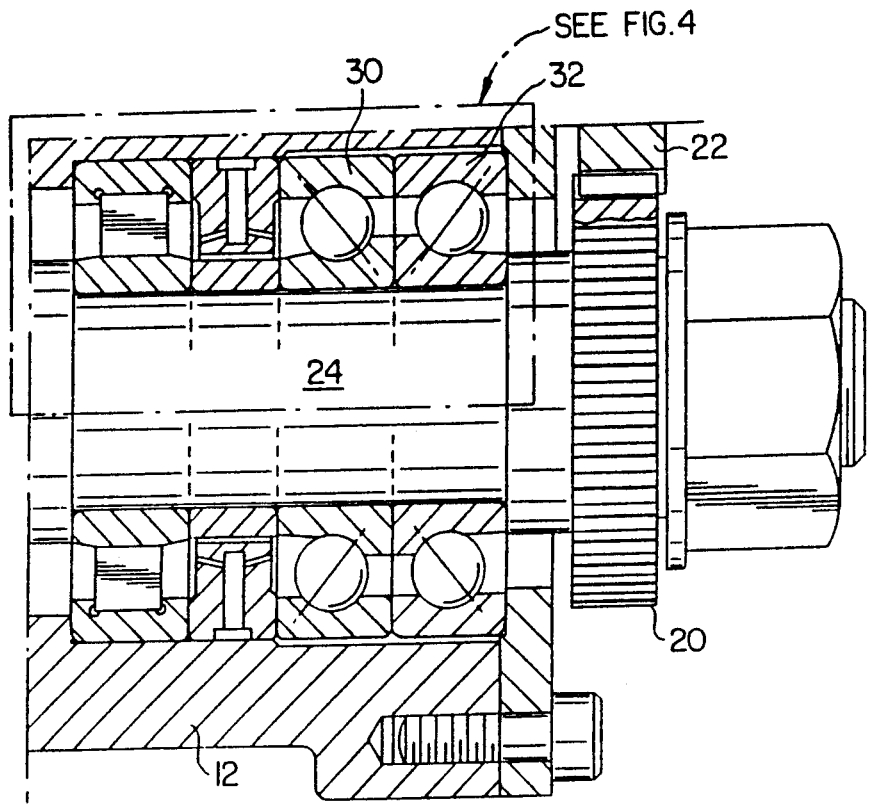
FIG. 3 is a view similar to FIG. 2 but showing a conventional mounting arrangement for rotors of a compressor of the type to which the present invention relates and designated "PRIOR ART"
Figure 4:
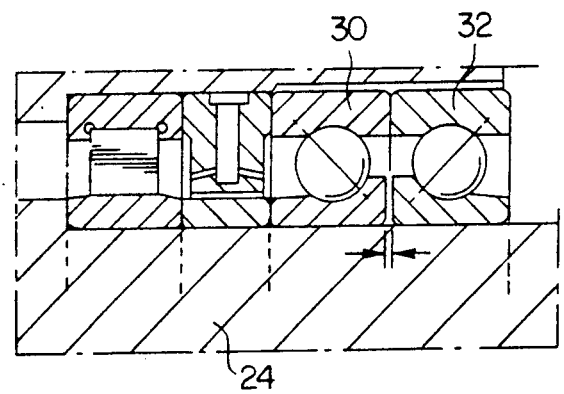
FIG. 4 is a fragmentary sectional view of the detail contained within the dots and dash lines of FIG. 3 with the housing end cover removed.
Figure 5:
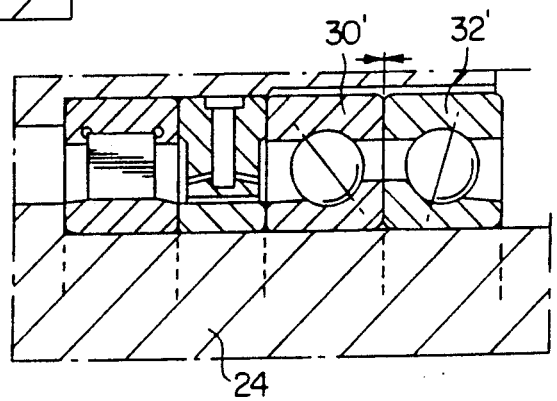
FIG. 5 is a view similar to FIG. 4 showing the bearing mounting arrangement of the present invention with the housing end cover removed.

The operation and cycle of the compressor are typical and when the compressor is in operation through a typical cycle, the rotors are subjected to radial and axial forces from the medium being compressed. The axial reaction force act in the direction indicated and are designated K in the various drawings. Thus when the load on the rotors from the medium increases, the axial force K increases. Further, the rotors operate at a high constant speed up to about 30,000 RPMs. It has been found that in a typical prior art bearing arrangement as shown in FIGS. 3 and 4, there are additional internal axial force components designated $F_{bc}$ resulting from centrifugal forces $F_c$ acting on the balls of the bearing. The effect of this force increases with speed and it has also been observed that the higher the contact angle, the higher the axial component $F_{bc}$ of the internal axial force. The practical consequence of this in a typical prior art bearing system utilizing angular contact bearings consisting of a thrust bearing 30 and a back-up bearing 32, each having the same large contact angle, is that the load carrying thrust bearing has to carry an axial force which is greater than the force produced by the compressor.

Figure 11:
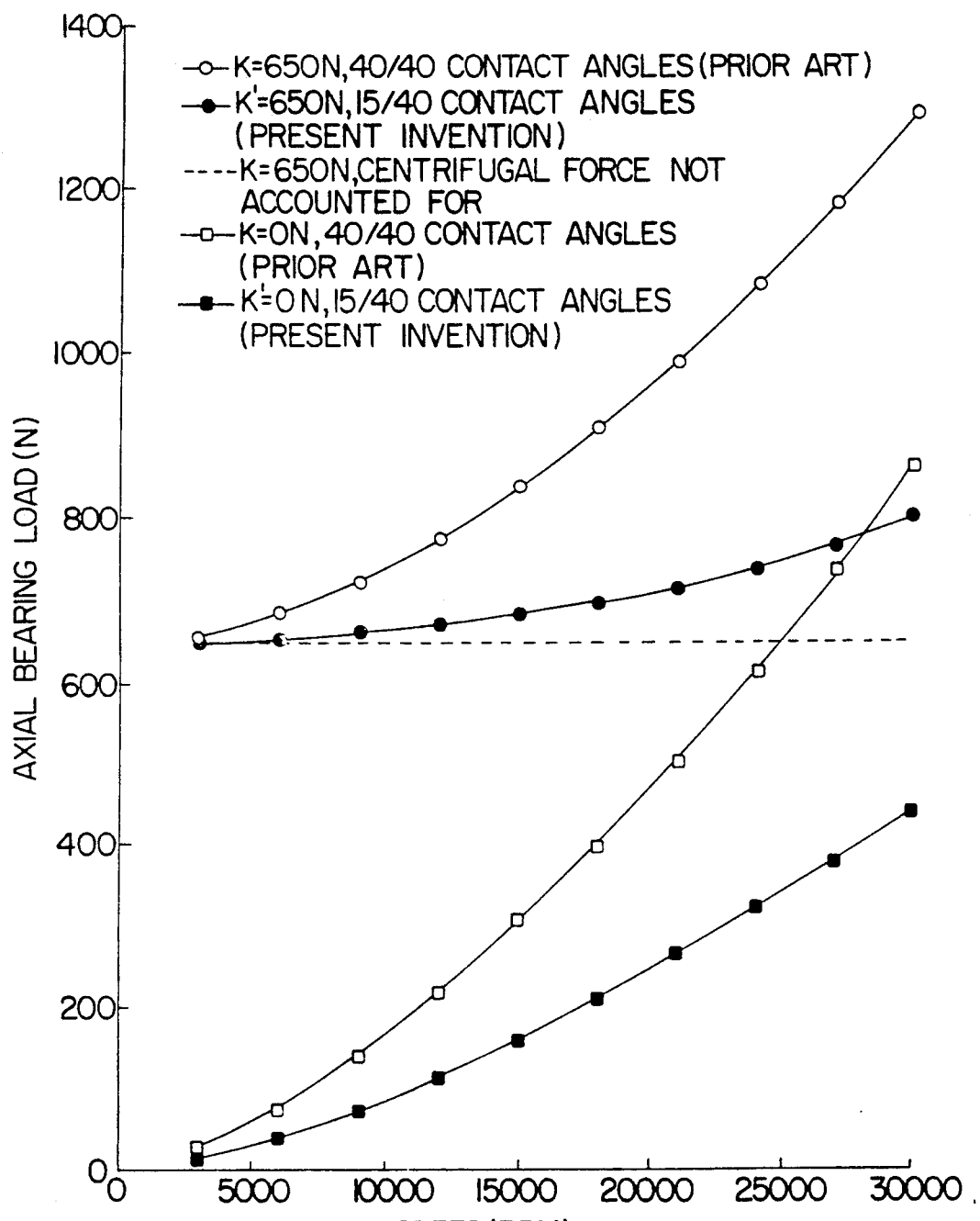
FIG. 11 shows the load of the thrust bearing as a function of bearing speed for a prior art bearing arrangement and a bearing arrangement in accordance with the present invention, bearing size 7204.
Figure 12:
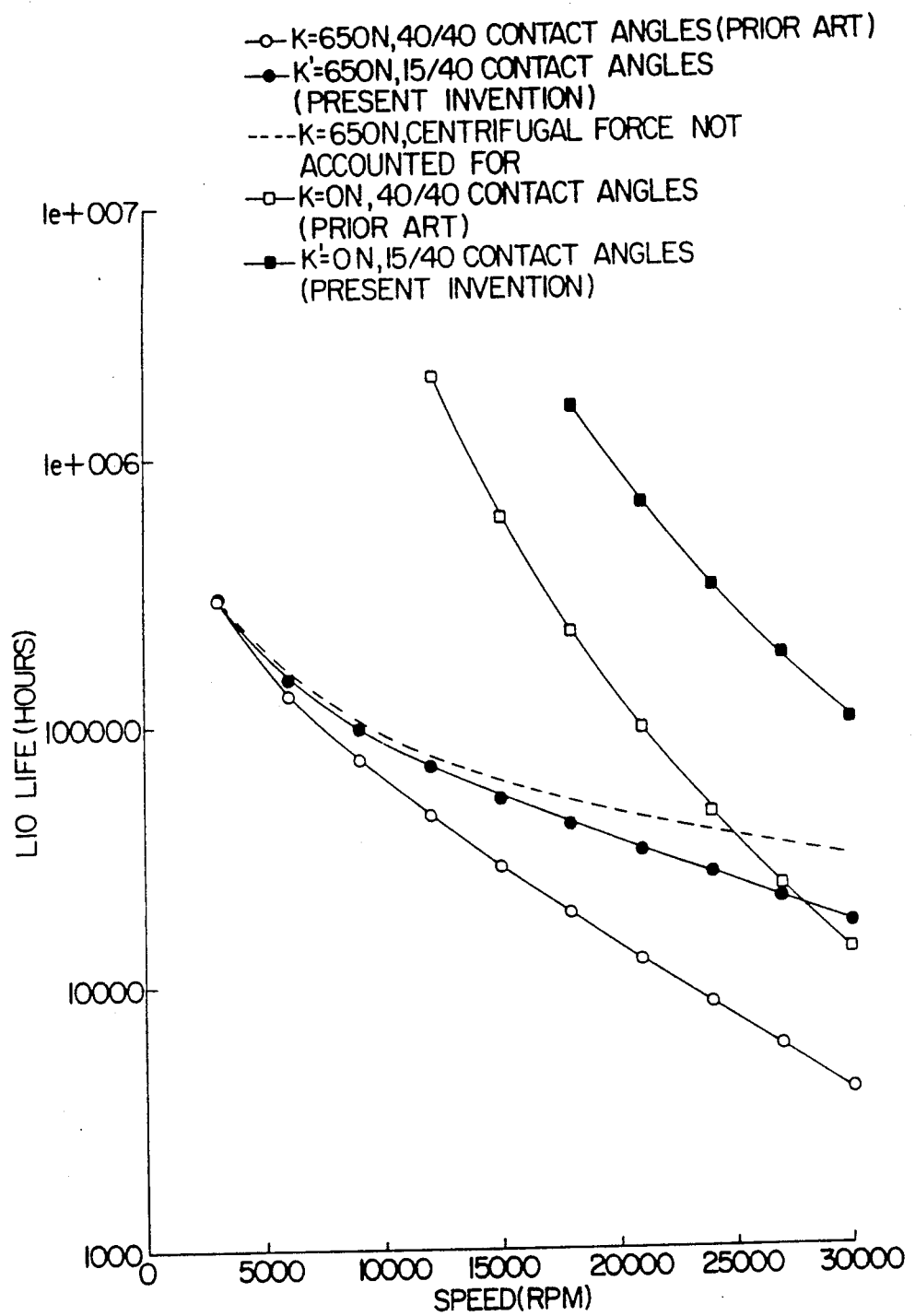
FIG. 12 shows the resulting bearing life from the loads per FIG. 11.

In accordance with the present invention, a thrust bearing arrangement is provided which effectively reduces the load on the bearings and thereby increases life as compared to the conventional angular contact bearing arrangements described above. To this end, in accordance with the present invention, the bearing mounting system includes an angular contact thrust bearing 30' having a large contact angle $\alpha$ and an angular contact back-up bearing 32' having a small contact angle $\beta$. These bearings are of generally conventional design having inner and outer rings $R_i$ and $R_o$ with raceways to accommodate a complement of balls B. Preferably the contact angle $\alpha$ of the thrust bearing 30 is in the range between 30° and 35° and the contact angle $\beta$ of the back-up bearing 32 is preferably in the range of between 15° and 20°. In accordance with the present invention a difference of about at least 10° and preferably 15° to 20° is desirable between the thrust bearing contact angle and back-up bearing contact angle. It has been found that this arrangement minimizes the induced axial forces. [compare FIGS. 8 and 9 and see FIGS. 10A and 10B]. The functional advantages of this arrangement are longer bearing life as shown by the computer simulated comparisons of FIGS. 11 and 12.

Furthermore, this arrangement permits a bearing mounting system with small clearance or preload, thereby providing for more accurate positioning of the rotors and thereby increasing compressor efficiency as compared with prior art bearing systems incorporating large axial clearances which have a negative effect on compressor efficiency.

Figure 10A:
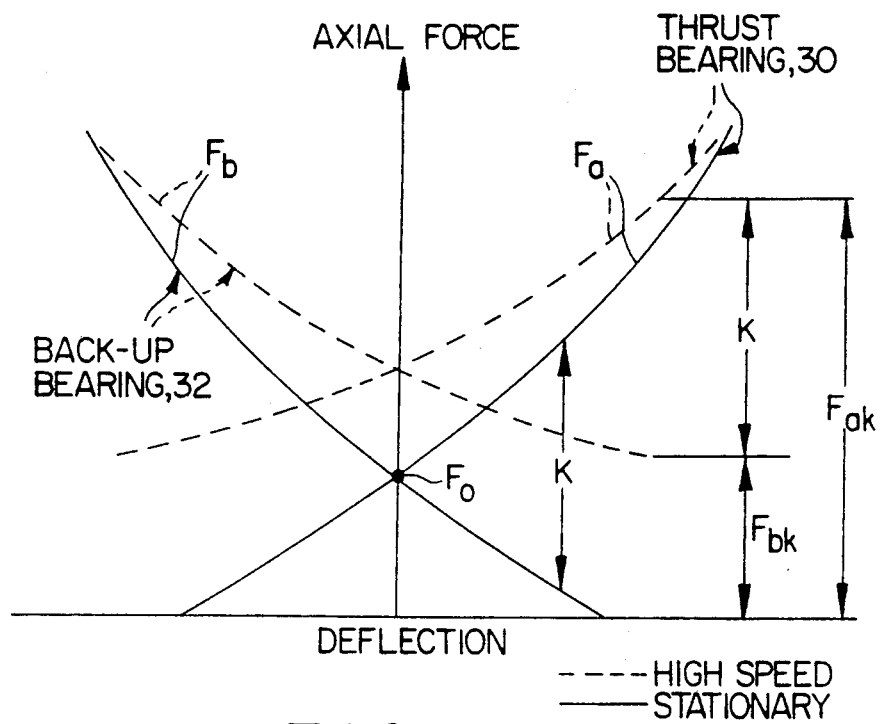
FIG. 10A and FIG. 10B show bearing deflection and axial forces comparing a prior art mounting and a bearing mounting in accordance with the present invention.
Figure 10B:
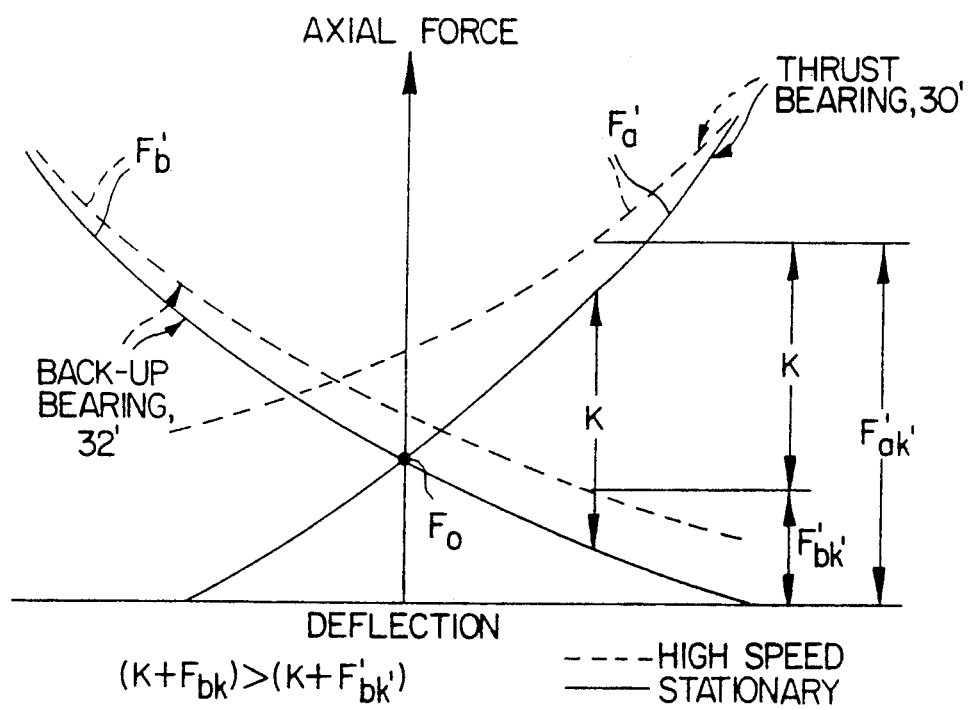

An examination and analysis of the graphs in FIGS. 10A and 10B shows that the forces in a bearing system in accordance with the present invention are less than in conventional prior art bearing systems. In both cases, the bearings are preloaded as indicated in FIGS. 10A and 10B. The curves represent the axial load and deflections of the duplex bearings and show the load sharing within the bearing system. With no external load K applied to the system and no rotation, the force within the bearing system is the preload force $F_o$. In a typical system when an external load K is applied to the bearing system, the deflection of the thrust bearing increases and the deflection of the back-up bearing decreases. The external load K is then the difference between the load of the thrust bearing and back-up bearing.

When the bearings rotate, the broken line curves represent the force-deflection relationship. At high deflection, the solid and broken line curves tend to merge and at low deflection the difference is more significant. Note that this difference is less for a bearing with a low contact angle (see FIG. 10B). Note that another difference is the slope of the curve is less for the low contact angle bearing, and at high speeds, the load of the back-up bearing is less for a given external force. Since the load $F_{ak}$, $F'_{ak}$ of the thrust bearing is the sum of the external load K, and the load $F_{bk}$, $F'_{bk}$ of the back-up bearing, it follows that the load $F'_{ak}$ of the thrust bearing is lower in a bearing system of the present invention as compared to the load $F_{ak}$ in a conventional system utilizing a pair of angular contact bearings having the same large contact angle $\alpha$ for the same external load K. (compare FIGS. 10A and 10B)

Figure 13:
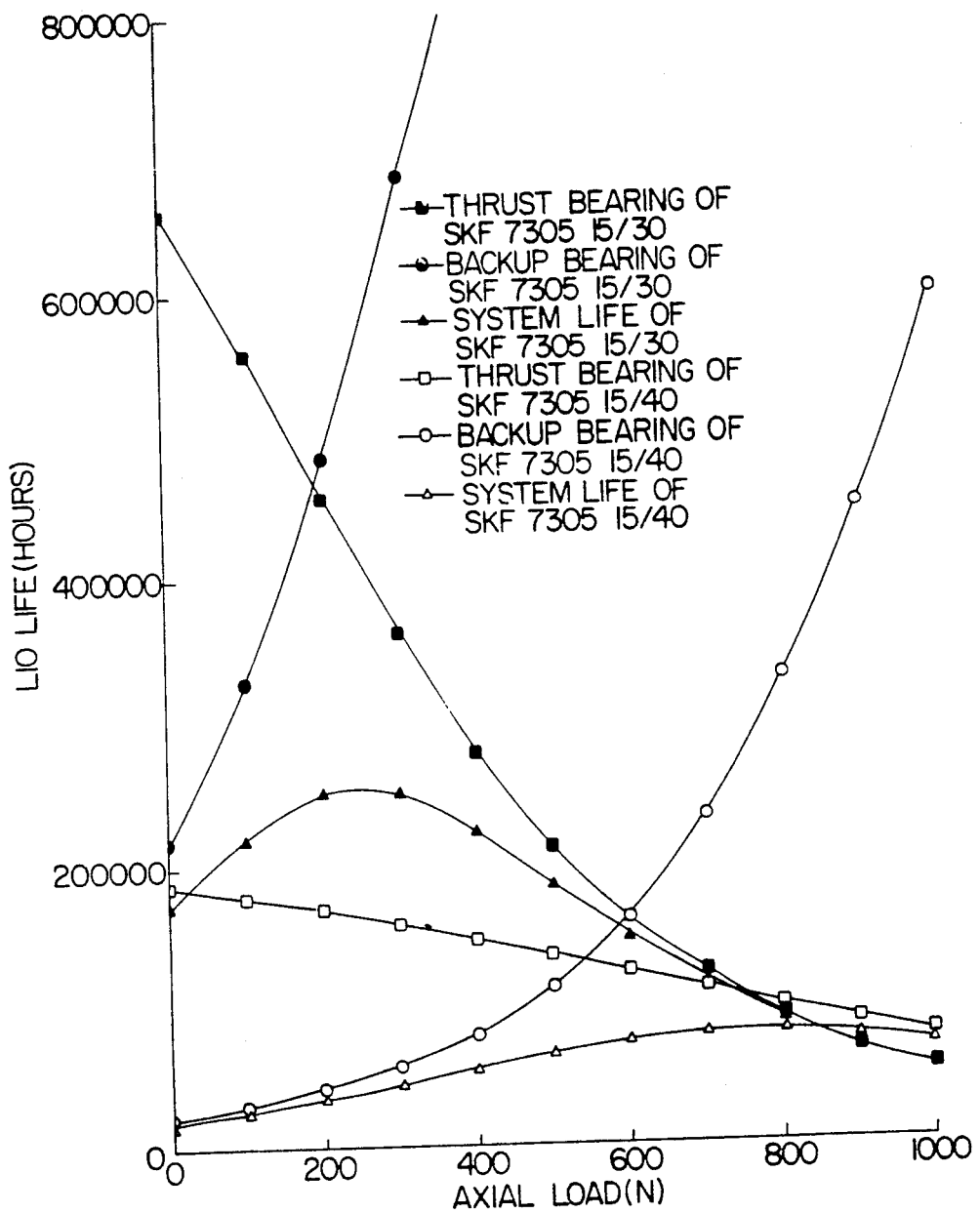
FIGS. 13 and 14 shows the load of the thrust bearing as a function of bearing speed in ndm comparing the preferred embodiment of the present invention with prior art configuration for bearing speeds of 24,000 rpm and an ndm of 1,000,000 rpm mm.
Figure 14:
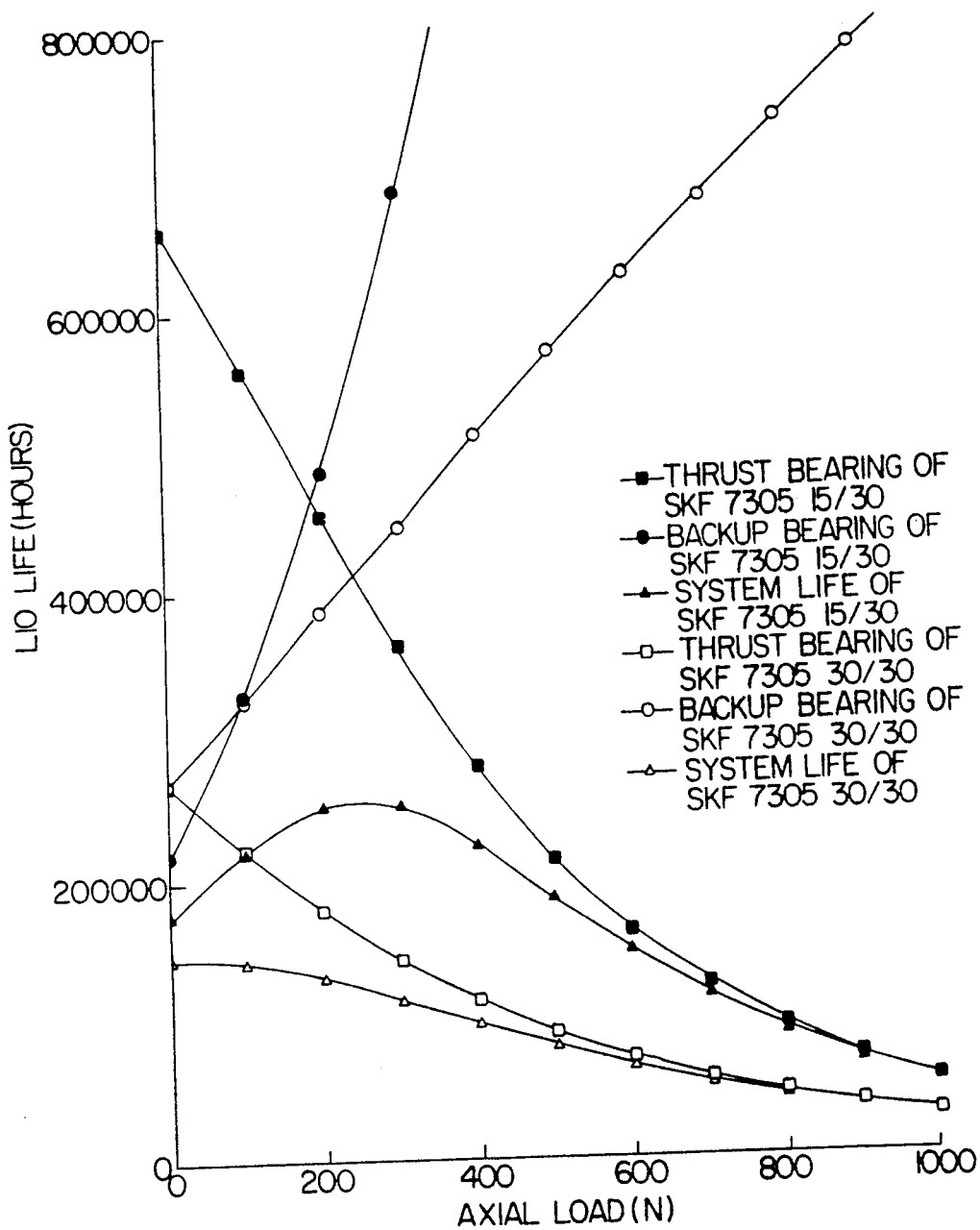

In accordance with the preferred embodiment of the present invention which is suitable for use in the applications which operate at speeds over ndm 750,000, the thrust 30 bearing preferably has a contact angle of about 30° and a back-up bearing 32 has a contact angle of about 15°. Ndm defines speed independently of bearing size. For example, speeds of 30,000 rpm are typical for a small dry air screw compressor bearing having a mean diameter of 41 mm. ndm for a bearing of this type at 30,000 rpm is 930,000 which is a typical ndm value for these applications. Dry air screw compressors are designed for speeds which yield bearing ndm speeds greater than 750,000. Thus, the preferred optimum configuration for bearings in these applications is a thrust bearing 30 having a contact angle between 30° and 35°, a back-up bearing 32 having a contact angle of between 15° and 20° and wherein the difference between the contact angles of the thrust bearing 30 and the back-up bearing 32 is in the range of between 10° and 20°. It has been found that at speeds over ndm 750,000, the combination of a 15° back-up bearing and a 40° thrust bearing such as disclosed in the MRC PUMPAC Publication is unsuitable for light external loads since the induced axial load from the 40° bearing overloads the 15° bearing. This phenomenon or effect is shown FIG. 13 where it can be seen that the life of the 15° bearing and the system life for the 15°/40° combination is low at light loads. The advantage of a combination 15°/30° arrangement in accordance with the present is shown in FIG. 14. The system life for a 15°/30° combination is superior at all loads.

In summary, the present invention provides a novel bearing mounting arrangement having particular application in high speed screw compressors wherein the internal forces due to centrifugal force of the balls are high and therefore reduction of induced axial force in the bearing system is significant as compared with conventual prior art arrangements where both the thrust bearing and the back-up bearing have large contact angles of generally the same angle. This reduction in bearing load is graphically illustrated in FIGS. 10A and 10B.

Even though the present invention has been shown and described in an assembly where the principal loads acting on the angular contact bearings are axial or thrust loads, the radial load being supported by a cylindrical bearing, the principles of the present invention and the advantages derived apply where the angular contact bearings carry combined radial and axial loads.

It is understood that the bearing system of the present invention utilizes angular contact bearings having a different "design contact angle" to produce the beneficial effects described herein. The design contact angle of an angular contact bearing is the angle measured at a light measuring load on the bearing with the bearing stationary.

Even though a particular embodiment of the invention has been illustrated and described herein, it is not intended to limit the invention and changes and modifications may be made therein within the scope of the following claims.

What is claimed is:

1. A screw compressor assembly, comprising:
   a housing;
   a pair of rotors rotatably journaled in said housing;
   a bearing system supporting the rotors including a radial cylindrical roller bearing; and
   thrust bearing means rotatably supporting the journals in the housing including a first angular contact thrust ball bearing having a predetermined contact angle in the range of between 30° and 35°, and a second back-up angular contact bearing having a contact angle less than said contact angle of said first thrust bearing and in the range of between 15° and 20°, the difference between the contact angles of the thrust bearing and backup bearing being at least between 10° and 20° whereby the internal force due to centrifugal force is small and therefore the induced axial force in the bearing system is minimized.

2. A screw compressor assembly, adapted for operation at speeds in excess of ndm 750,000 comprising:
   a housing;
   a pair of rotors rotatably journaled in said housing;
   a bearing system supporting the rotors including a radial cylindrical roller bearing; and
   thrust bearing means rotatably supporting the journals in the housing including a first angular contact thrust ball bearing having a predetermined contact angle in the range of between 30° and 35°, and a second back-up angular contact bearing having a contact angle less than said contact angle of said first thrust bearing and in the range of between 15° and 20°, the difference between the contact angles of the thrust bearing and backup bearing being at least between 10° and 20° whereby the internal force due to centrifugal force is small and therefore the induced axial force in the bearing system is minimized.

3. A screw compressor as claimed in claim 2 wherein said thrust bearing and back-up bearing are mounted back to back.

4. A screw compressor as claimed in claim 2 wherein said thrust bearing and back-up bearing are mounted face to face.

5. A screw compressor as claimed in claim 2 wherein the contact angle of the thrust bearing is 30° and the contact angle of the back-up bearing is about 15°.

* * * * *